Figure 14:
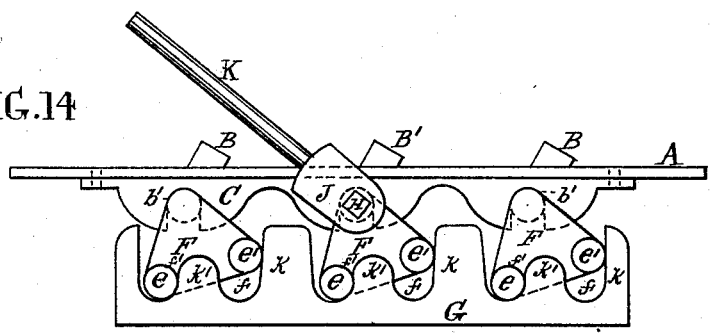

(No Model.) 3 Sheets—Sheet 1.
J. H. McILVAIN.
SHAKING GRATE FOR RANGES.
No. 346,056. Patented July 20, 1886.
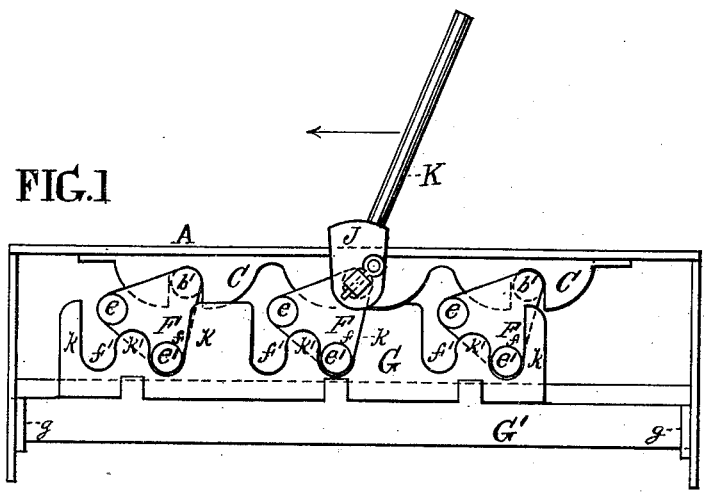
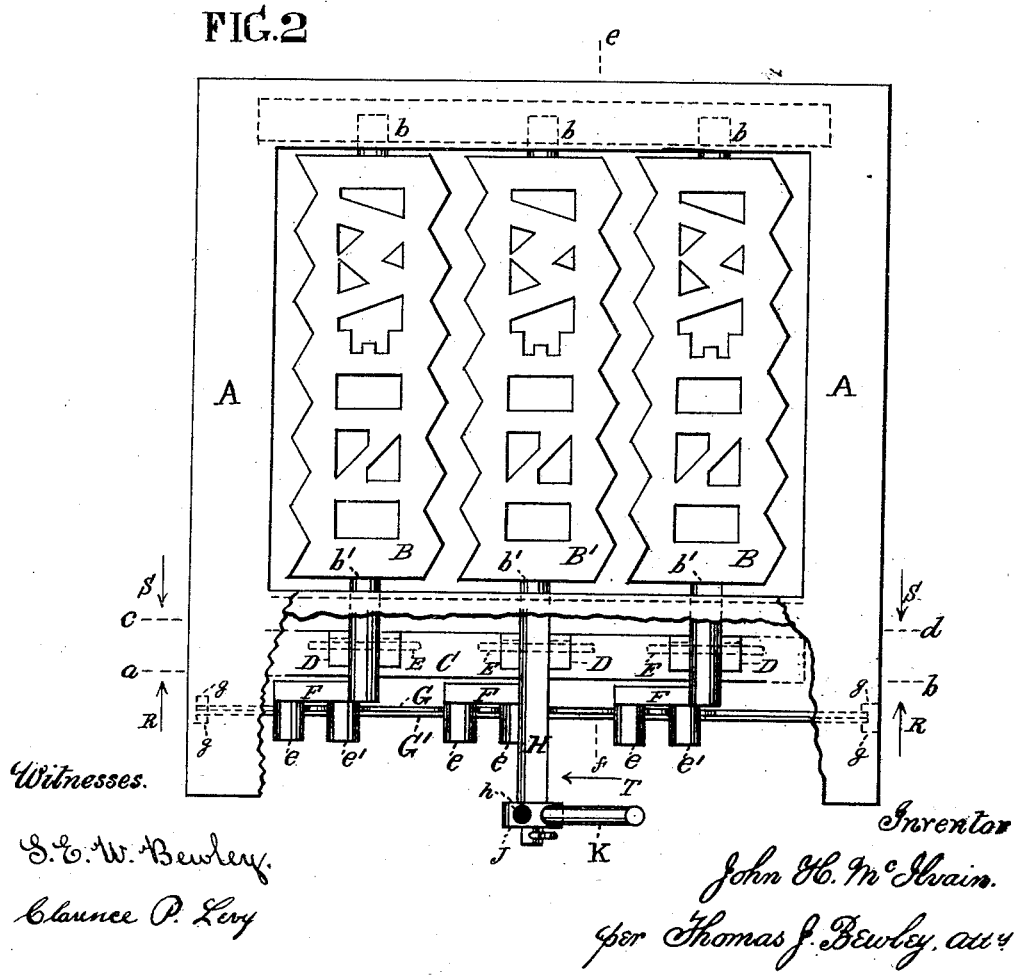
Witnesses.
S. E. W. Bewley.
Claunce P. Levy
Inventor
John H. McIlvain.
per Thomas J. Bewley, att'y
N. PETERS, Photo-Lithographer, Washington, D. C.

(No Model.) 3 Sheets—Sheet 2.
J. H. McILVAIN.
SHAKING GRATE FOR RANGES.
No. 346,056. Patented July 20, 1886.
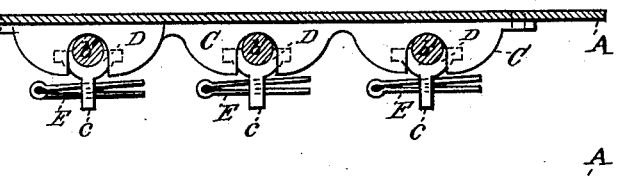
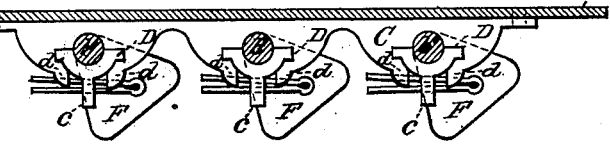
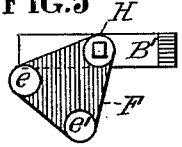
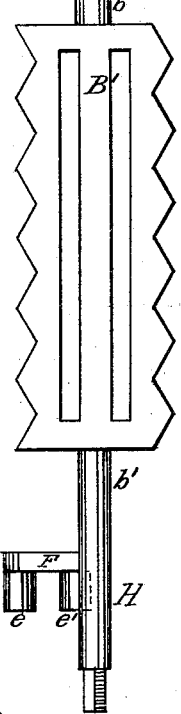
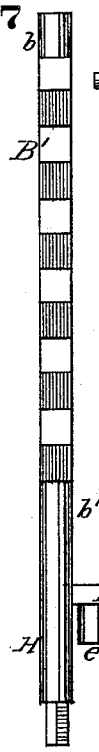
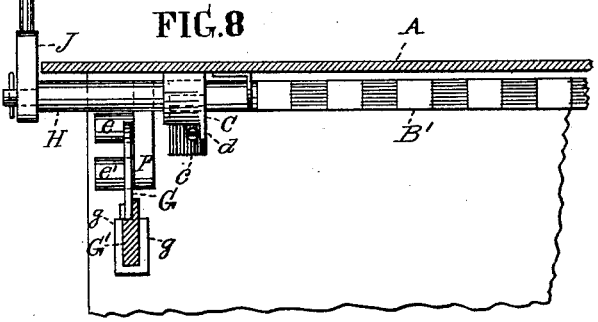
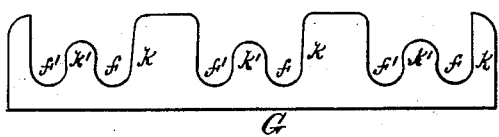
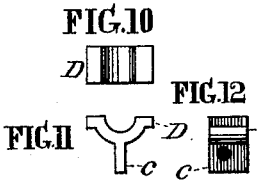
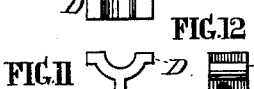
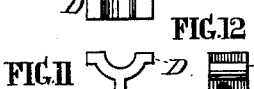
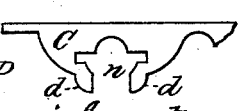
Witnesses.
S. E. W. Bewley.
Clarence P. Levy.
Inventor.
John H. McIlvain.
per Thomas J. Bewley, Atty.
N. PETERS, Photo-Lithographer, Washington, D. C.

(No Model.) 3 Sheets—Sheet 3.

J. H. McILVAIN.
SHAKING GRATE FOR RANGES.

No. 346,056. Patented July 20, 1886.

Witnesses.
S. E. W. Bewley.
Clarence P. Levy.

Inventor
John H. McIlvain.
per Thomas J. Bewley, Atty.

United States Patent Office.

JOHN H. McILVAIN, OF CAMDEN, NEW JERSEY, ASSIGNOR TO JOSEPH B. BARTLETT AND CHARLES F. BARTLETT, OF PHILADELPHIA, PA.

SHAKING-GRATE FOR RANGES.

SPECIFICATION forming part of Letters Patent No. 346,056, dated July 20, 1886.

Application filed March 6, 1885. Serial No. 157,962. (No model.)

*To all whom it may concern:*

Be it known that I, JOHN H. McILVAIN, a citizen of the United States, residing at Camden, in the county of Camden and State of New Jersey, have invented certain new and useful Improvements in Shaking-Grates for Furnaces, Ranges, &c., of which the following is a specification.

My invention has for its main object the oscillating or causing of a reciprocating partially-rotating movement of a series of grate-bars arranged in a horizontal plane. These bars, as usual, form a support in the base of the fire-pot of a furnace for the fuel.

It has been a source of constant trouble to manufacturers to provide suitable means in the arrangement of sliding grate-bars of a furnace or in a tilting grate, whereby exhausted material—such as ashes or clinkers—may be quickly removed from beneath the mass of fire and the bars returned to their level position without danger of clogging or breaking.

Another object of my invention is to provide means for easily and expeditiously inserting or removing any of the bars.

The invention consists, in the first place, in the positive connection of the bars with equilateral-triangular segmental plates having bosses or studs upon their outer surfaces, which engage with slots in a horizontal sliding plate or bar supported and moved in suitable bearings, and an operating-lever attached to a bracket connected to a boss on one of said segmental plates, whereby the series of grate-bars may be caused to partially rotate upon their journals in a slight degree or brought one-fourth around upon their axes at right angles to their normal position without the possibility of becoming clogged in their movements.

The invention further consists in a detachable pedestal block or stirrup, forming the lower half of the front bearing of a grate-bar, having a semicircular groove in its upper surface, in which the journal rests, and provided with a stud that projects down from its lower surface, in which is a hole for the insertion of a key-bolt, the upper half of the bearing being formed in a casting secured to the under side of the base-plate, in which are formed seats for the reception of the blocks, that extend only partially through the width of said casting. Lugs parallel with said stud extend downward from the piece or casting in such a manner that when the key-bolt is inserted they prevent the block from falling out or being pushed from position.

Figure 15:
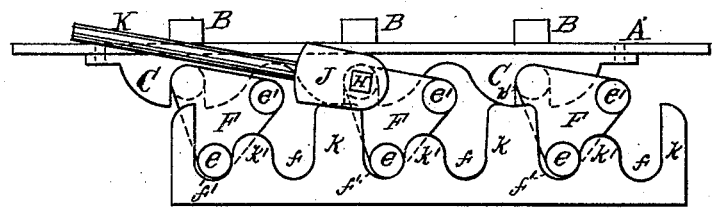

In the accompanying drawings, which make a part of this specification, Figure 1 is a front elevation of my improved grate-bar, showing the segments, studs, and the connection with the sliding plate. Fig. 2 is a plan view of the grate with a portion of the base-plate A of the furnace broken away. Fig. 3 is a sectional view in elevation, looking in the direction of the arrows R on the line *a b* of Fig. 2. Fig. 4 is a like view looking in the direction of the arrows S on line *c d*, same figure. Fig. 5 is an end view of one of the segments F and a bar, B. Figs. 6 and 7 are views at right angles to each other of the same. Fig. 8 is a side view of the central bar of a series, showing the connection with the attachment and base-plate of a furnace, taken at the line *ef* of Fig. 2. Fig. 9 is a face view of the sliding plate G detached from its connections. Figs. 10, 11, and 12 are a top, side, and end views of the removable pedestal or stirrup D. Fig. 13 is a rear face view of a portion of the casting C, showing the opening *n*, in which a block or stirrup, D, may be inserted. Fig. 14 is a front elevation showing the equilateral-triangular segments as having moved the sliding plate G partially to the right, with the stud *e'* ready to disengage its connection therewith. Fig. 15 is a like view showing the segments turned to their full extent, the bars B being at right angles to the position seen in Fig. 2.

Like letters of reference in all the figures indicate the same parts.

A is the base-plate of a furnace for heating and warming purposes, upon which the fire-pot and other appurtenances are supported.

B B B are three bars or sections of a grate. These sections may, however, be unlimited in number. They are provided with journals *b b'*, in order that they may be rotated upon their axes. The rear end journals, *b*, rest in orifices in the back plate of the furnace. The front end journals, *b'*, rest in semicircular openings n (seen clearly in Fig. 13) of the casting or upper half of the bearing, which is riveted to the under side of the base-plate. These openings n are in the rear face of the casting, and extend only part way through to the front face, corresponding in shape to the loose pedestal blocks or stirrups D, which are inserted therein after the bars are in place. These blocks act as the lower half of the bearings for the journals b', and are held in position by the key-bolts E, that pass through holes in the studs c of the blocks or stirrups, in front of and parallel with the lugs d, that project from the lower side of the casting C. This connection prevents the blocks D from being pushed out of their seats in the openings n, above referred to.

To the front end of each bar or section is cast an equilateral-triangular segment, F, the apex of which is projected from the journals b'. To the intersections of the other angles of these segments are cast the circular bosses e e', that engage with the open slots f f' of the sliding plate G. This plate rests longitudinally in guides upon the upper edge of the supplemental bar G', the ends of which fit and have their bearings between lugs g g on the inner faces of the sides of the ash-pit plates.

To the outer face of the segment of the central bar, B', of the series of three is an arm, H, rigidly connected thereto, that extends outside of the front plate of the furnace. Upon the outer end of this arm is either cast or fitted to a shoulder the bracket J, in the upper end of which are the orifices h, for the insertion of one end of the slip lever K, which serves as a means whereby the bars or sections may be oscillated or semi-rotated when it is desired to remove the ashes or clinkers, or to cause the contents of the fire-pot to fall into the ash-pit for removal.

The operation of oscillating or partially rotating the series of bars is as follows: The lever K is inserted in one of the orifices h of the bracket J, and moved in the direction of the arrow seen in Fig. 1, which causes the segment on the end of the shaft B' to move in like manner. The parts being rigidly connected, the lower stud, e', of the pair moves to the right, and pushes the plate G with it by its action upon the finger k sufficiently far to engage the succeeding boss e with the slot f', which in turn pushes the finger k' of the plate until the bars are turned at right angles to their level position. A reverse movement of the lever returns the bars to their normal position of acting as a grate.

When it is desired to merely shake down ashes from the under surface of the fire, the lever is given but slight alternate strokes to the left and right.

When the body of coal within the fire-pot is to be permitted to fall into the ash-pit, the lever K is turned to the left sufficiently far to cause the bars to move one-fourth around upon their axes, which allows abundant space between them for the purpose.

To remove a bar from the series, the key-bolt E is withdrawn and the block or stirrup D pushed back out of its connection with the opening n of the casting C, when the front end of the bar will drop from its position and can readily be removed.

By forming separate and detachable bearings for each bar of the series any one that becomes defective can be readily removed without disturbing the remainder, and as the bearings are protected from the direct action of the fire, their liability to be injured thereby is overcome, as well as a possibility of cinders falling therein.

I claim as my invention and desire to secure by Letters Patent—

1. A bearing for the journals of grate-bars, consisting of the detachable block D, having a stud, c, in combination with the piece C, provided with a recess, n, for the reception of said blocks, and with lugs d and key-bolt E, substantially as herein shown and described.

2. In a grate for furnaces, the bars B, having journals and equilateral-triangular segmental plates F projected from the forward ends of the journals at right angles thereto, said plates being provided with the studs e, in combination with the sliding plate G, supported in suitable bearings, and arm H, extending forward of the plates F, substantially as herein shown and described.

JOHN H. McILVAIN.

Witnesses:
THOMAS J. BEWLEY,
F. W. NEWBOLD.